United States Patent [19]

Ausiello et al.

[11] Patent Number: 5,479,885
[45] Date of Patent: Jan. 2, 1996

[54] ADMISSION MANIFOLD OF MODULATABLE IMPEDANCE AND LOW HEAD LOSS

[75] Inventors: Francesco Ausiello, Bologne, Italy; Michaël Pontoppidan, Rueil Malmaison, France

[73] Assignee: Magneti Marelli France, Nanterre, France

[21] Appl. No.: 399,147

[22] Filed: Mar. 6, 1995

[30] Foreign Application Priority Data

Mar. 7, 1994 [IT] Italy ........................... 94 02596

[51] Int. Cl.$^6$ ........................... F02B 27/02; F02M 35/10
[52] U.S. Cl. ........................... 123/184.55; 123/184.56; 123/184.57
[58] Field of Search .................. 123/184.53, 184.55, 123/184.56, 184.57, 184.59, 184.24, 184.34, 184.42, 184.47

[56] References Cited

U.S. PATENT DOCUMENTS

| | | | |
|---|---|---|---|
| 4,539,947 | 9/1985 | Sawada et al. | 123/184.57 |
| 4,543,918 | 10/1985 | Ma | 123/184.53 |
| 4,546,733 | 10/1985 | Fukami et al. | 123/184.57 |
| 5,009,200 | 4/1991 | Van Basshuysen et al. | 123/184.56 |
| 5,307,767 | 5/1994 | Schutz | 123/184.57 |

FOREIGN PATENT DOCUMENTS

| | | |
|---|---|---|
| 0255059 | 7/1986 | European Pat. Off. . |
| 1294087 | 1/1963 | Germany . |
| 59-213921 | 12/1984 | Japan . |
| 2252918 | 3/1989 | Japan . |
| 2223632 | 9/1990 | Japan . |
| 2291422 | 12/1990 | Japan . |
| 1423450 | 2/1976 | United Kingdom . |

OTHER PUBLICATIONS

Research Disclosure Jul. 1986—n° 267—pp. 428–430. Emsworth (GB) "Engine Intake Turning".
Derwent Pulications Ltd.—London (GB)—Week 8811 Mar. 1988 "Super-charging system for IC engines—uses a helmholtz resonator, turned to the rpm, to increase the air supplied" SU 1328–566.A (Barsukov).

Primary Examiner—Marquerite Macy
Attorney, Agent, or Firm—Larson and Taylor

[57] ABSTRACT

The admission manifold comprises a plenum chamber (1) downstream from a butterfly valve (2) and defining a resonance volume, an air inlet diffuser (6), an inlet (8) connected to the outlet from the butterfly valve (2), an air flow guide (11), and as many suction ducts (15) as there are cylinders in the engine, each duct feeding a corresponding cylinder thereof. The guide (11) serves to share admission air coming from the diffuser (6) between the ducts (15), and it is mounted downstream from the diffuser (6) in such a manner that the outlet (10) from the diffuser (6) opens out towards the tubular inlet (12) of the guide (11) which has an upstream edge spaced apart transversely from the downstream edge of the diffuser (6) by a permanent diaphragm. The diffuser (6), the guide (11), and at least an upstream portion of each duct (15) are housed inside the plenum (1). The manifold is applicable to feeding air to fuel injection internal combustion engines.

10 Claims, 2 Drawing Sheets

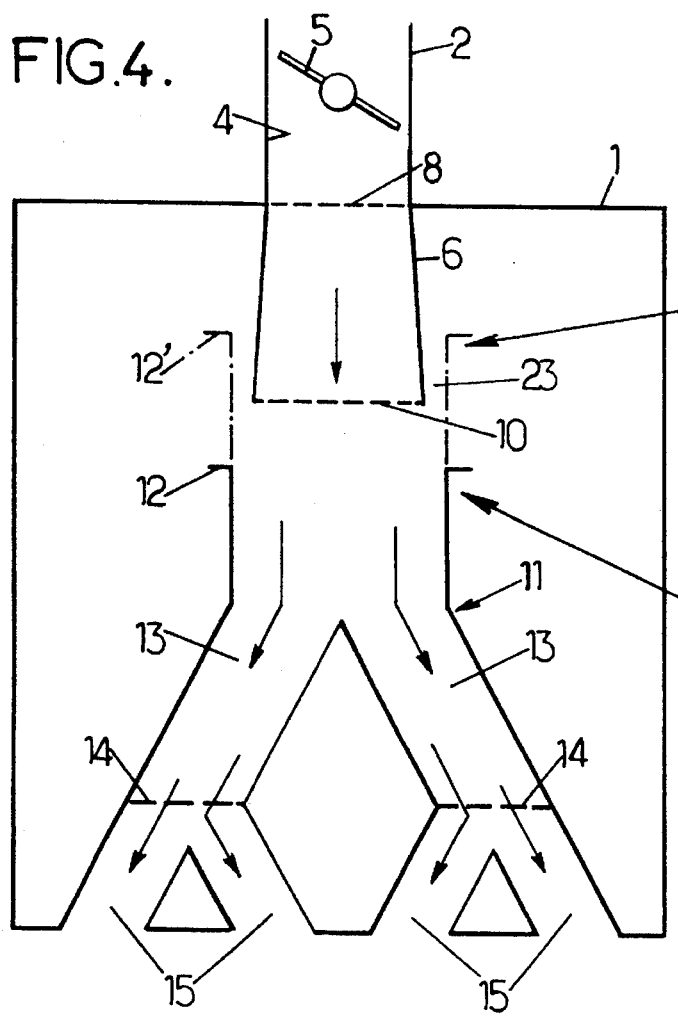

ADMISSION MANIFOLD OF MODULATABLE IMPEDANCE AND LOW HEAD LOSS

The invention relates to an admission manifold of modulatable impedance and low head loss for an internal combustion engine fitted with a fuel injector installation, in particular of the so-called "multipoint" type and including, for each cylinder of the engine, at least one injector that injects fuel into a suction duct of the engine's air admission manifold directly upstream from the admission valve(s) of the corresponding cylinder.

Admission manifolds for fuel injection internal combustion engines are already known, and each comprises:

a plenum chamber located downstream from a butterfly valve that controls the flow of air fed to the engine, said plenum chamber defining a resonance volume; and at least as many suction ducts as there are cylinders in the engine, each suction duct feeding a corresponding cylinder with admission air that it receives from the plenum chamber.

Those known admission manifolds suffer from the following drawbacks: each admission manifold model is defined and made in such a manner as to be tuned in frequency as a function of the engine to which it is to be fitted, so as to present optimum acoustic and fluidic performance. However, any development or modification to the engine requires the manifold to be modified, and in particular requires its size and shape to be modified, specifically the lengths of its suction ducts and the way in which the area and/or the shape of their cross-sections varies need to be modified so as to maintain good acoustic and fluidic properties, and that usually means that the entire admission manifold needs to be redesigned.

To remedy those drawbacks, proposals have already been made for admission manifolds that are frequency tunable, and that therefore have acoustic performance that is capable of being modulated. However, such admission manifolds include two coaxial diffuser drums that are spiral nested one in the other, that are mounted to rotate relative to each other, and that are fitted with relative locking means enabling the frequency of the admission manifold to be tuned to the type of engine on which it is fitted.

As a result, such devices are complex in structure and therefore costly, they are bulky, and they suffer high head losses.

An object of the invention is to remedy the above-mentioned drawbacks and to provide an admission manifold of modulatable impedance that satisfies various practical requirements better than before.

An object of the invention is therefore to provide an admission manifold of modulatable impedance which presents low head losses, which is compact, which enables optimized acoustics to be achieved, and which is easily adapted to different families of engines, or indeed adaptable in operation on an engine as a function of engine operating conditions.

Another object is to provide an admission manifold of modulatable impedance which is simple and cheap in structure, while accepting various different possible types of injector.

To this end, the invention provides an admission manifold of the above-specified type, characterized in that it further comprises:

an air inlet diffuser whose inlet is connected to the outlet of the butterfly valve; and an air flow guide for sharing admission air leaving the diffuser between the suction ducts, and mounted downstream from the inlet diffuser in such a manner that the outlet from the diffuser opens out towards the tubular inlet of the guide which has an upstream edge spaced transversely from the downstream edge of the diffuser relative to the air flow direction so as to define an adjustable permanent diaphragm effect between the inlet diffuser and the flow guide, the inlet diffuser, the flow guide, and at least part of the suction ducts being housed in the plenum chamber.

An advantage of such an admission manifold is that the presence of the diffuser at the outlet from the butterfly valve limits head losses, and also facilitates sharing admission air from the air flow guide between the suction ducts. In addition, the adjustment of the gap between the downstream edge of the diffuser and the upstream edge of the flow guide makes it possible to modulate acoustic performance and thus to tune the frequency of the admission manifold to the engine without any need for changing its architecture to any great extent, and by housing for the inlet diffuser, the flow guide, and at least part of the suction ducts in the plenum chamber as constituted by the case defining the overall volume of the manifold it is possible to achieve a structure that is compact.

In addition, the fact that the manifold comprises only four parts, namely the plenum chamber, a set of suction ducts, the inlet diffuser, and the flow guide, and since each part can be made of synthetic material or of a metal or an alloy (preferably by casting), constitutes a factor that simplifies the structure and thus contributes to keeping costs down.

The admission manifold of the invention may be such that the inlet diffuser penetrates axially along the air flow axis into the tubular inlet of the flow guide in such a manner as to ensure axial overlap between the diffuser and the guide if it is desired for acoustical modulation that the volume inside the plenum but surrounding the diffuser and the flow guide should behave like a resonator that is in parallel with the duct defined in the diffuser and the guide.

In contrast, if it is desired that said inside volume of the plenum chamber should behave like a resonator that is in series between the inlet diffuser and the flow guide, while retaining the same basic structure for the manifold, then the diffuser and the flow guide can be disposed in such a manner that the diffuser opens out into the plenum chamber upstream from the flow guide, and that there then exists an axial gap between the downstream edge of the diffuser and the upstream edge of the guide, or that the downstream edge of the diffuser is substantially even with the upstream edge of the flow guide.

The relative axial and/or transverse position of the diffuser and the flow guide can be "frozen" for a particular type of engine, and can subsequently be modified and "frozen" again every time the engine changes or is adapted, thereby ensuring acoustic modulation that matches development of a family of engines, however it is also possible in an embodiment that is more complex and more expensive for the admission manifold to include means for adjusting and locking the relative axial and/or transverse position of the inlet diffuser and of the flow guide so as to make in-service matching possible as a function of the operating conditions of the engine.

Such adjustment means may be driven by at least one actuator as a function of the loading on the engine fitted with the manifold, e.g. by detecting operating parameters of the engine such as its speed and the air pressure in the admission manifold or the flow rate of the admission air, thereby enabling the fluidic behavior of the manifold to be tuned to maximum torque and maximum power peaks of the engine.

In preferred embodiments that enable compactness to be improved and/or that enable head losses to be further reduced, the admission manifold further includes one or more of the following dispositions:

the flow guide shares the admission air between two groups of suction ducts and includes, downstream from its tubular inlet, two branches, each feeding air to the inlets of a respective one of the groups of suction ducts;

the cross-section of each branch of the flow guide is substantially elliptical and progressively tapering towards the suction ducts;

the inlet diffuser has a frustoconical diverging shape that is circular in section;

each suction duct includes an upstream portion wound in a circular arc from the outlet of the corresponding branch of the flow guide and contained in the plenum chamber, and a downstream portion that is substantially rectilinear, the downstream end thereof projecting from the plenum chamber and being secured to a flange for fixing to the cylinder head of the engine and being designed to carry an injector for injecting fuel into the corresponding cylinder; and the cross-section of each suction duct is substantially complementary in shape to the section of the corresponding duct of the cylinder head, which section is usually circular, oval, or inscribed in a rectangle, and substantially constant along its entire length.

Other advantages and characteristics of the invention appear from the description given below by way of non-limiting example of an embodiment that is described with reference to the accompanying drawings, in which:

FIG. 4 is an overall view corresponding to FIG. 1; and

FIGS. 5 and 6 are diagrams corresponding to a resonator operating respectively in parallel and in series in the device of FIG. 4 as a function of the relative axial positions of the diffuser and of the flow guide.

Figure 1:
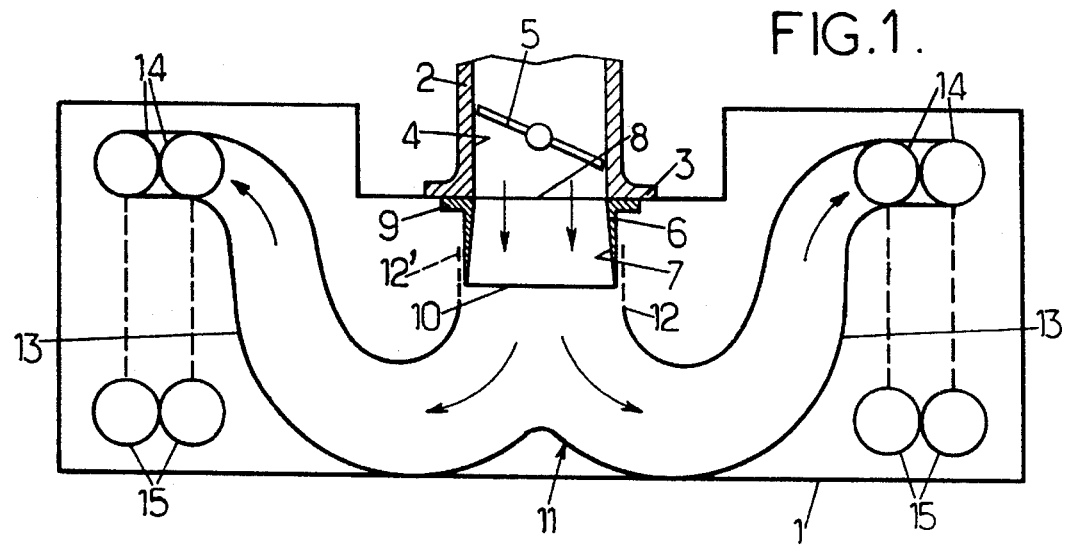
FIG. 1 is a diagram in longitudinal section of an admission manifold for a fuel injection engine having four cylinders in line.
Figure 2:
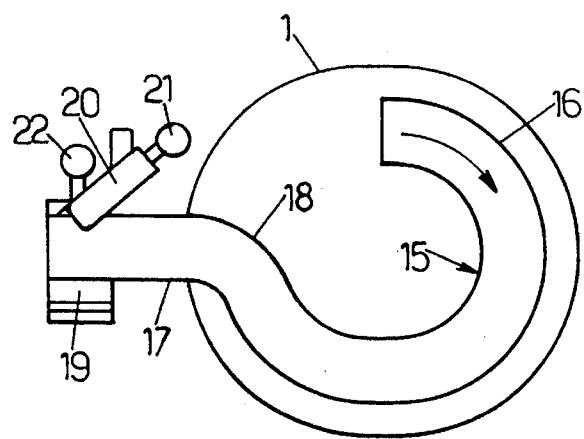
FIG. 2 is a diagram that is partially in cross-section and partially in lateral elevation showing the admission manifold of FIG. 1.
Figure 3:
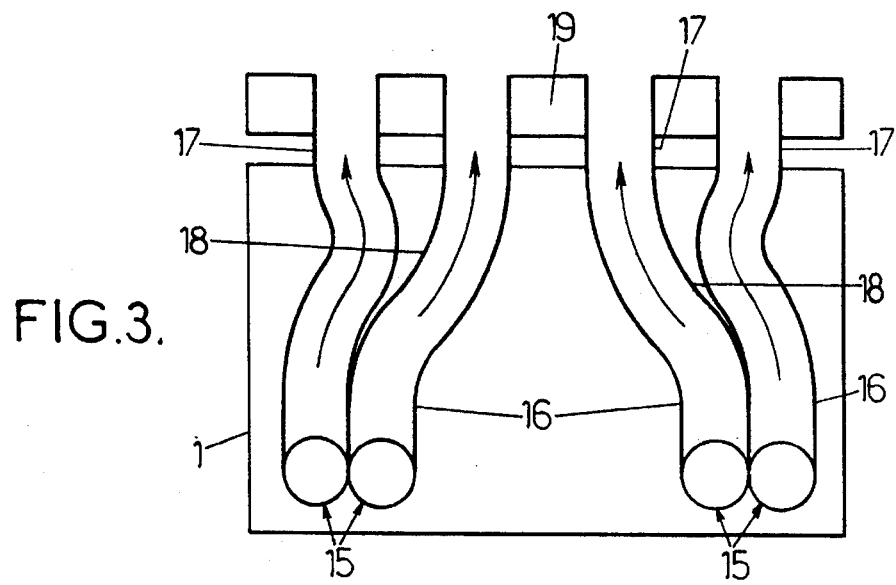
FIG. 3 is another diagrammatic section through the manifold of FIGS. 1 and 2.

The admission manifold of FIGS. 1 to 3 comprises a plenum chamber 1 implemented in the form of a housing that constitutes the case of the manifold and whose inside volume constitutes a resonance volume. On the upstream end of the plenum chamber 1 a butterfly valve 2 is fixed by any appropriate mechanical means, which valve is provided, for this purpose, with a flange 3 surrounding the outlet end of its own duct 4 that contains, in conventional manner, a disk-shaped shutter member 5 referred to as a "butterfly" which is mounted to rotate about a diametral axis so as to control the flow of air fed to the engine. The plenum chamber 1 thus positioned downstream from the butterfly valve 2 has an air inlet opening that directly faces the outlet from the butterfly valve duct 4 and that is defined by the upstream end of the circular section frustoconical diverging channel 7 of an air inlet diffuser 6 which is mounted in the plenum chamber 1 in such a manner that its inlet 8 is connected to the outlet of the butterfly valve 2. To this end, the inlet 8 of the diffuser 6 is surrounded by a flange 9 whereby the diffuser 6 can be secured both to the wall of the plenum chamber 1 and to the flange 3. The outlet 10 of the diverging channel 7, at the downstream end of the diffuser 6, opens out to face the tubular inlet 12 of an air flow guide 11 mounted inside the plenum chamber 1 downstream from the diffuser 6, so that the upstream edge of the guide 11 which defines its tubular inlet 12 is spaced transversely from the downstream edge of the diffuser 6 (transversely relative to the air flow direction as represented by arrows in the diffuser 6 and the guide 11), thereby defining its outlet 10.

As a result, a permanent diaphragm effect is ensured by the transverse spacing between the diffuser 6 and the guide 11, which is likewise made in the form of a single independent part.

In addition, as shown in solid lines in FIG. 1, the guide 11 is fixed in the plenum chamber 1 in such a manner that the diffuser 6 opens out via its outlet 10 into the plenum chamber 1 upstream from the opening 12 of the guide 11, and there thus exists an axial space between the upstream edge of the guide 11 and the downstream edge of the diffuser 6. The advantage of this configuration is explained below with reference to FIGS. 4 and 6.

However, it is also possible, as shown in chain-dotted lines in FIGS. 1 and 4, for the diffuser 6 to be engaged axially in the tubular inlet 12' of the guide 11 (i.e. along the common axis of the butterfly valve 2 and the diffuser 6, and thus along the air flow axis therein), while nevertheless leaving a radial or transverse space or gap. Under such circumstances, the manifold has axial overlap between the guide 11 and the diffuser 6 defined by the axial distance between the upstream edge of the inlet 12 of the guide 11 and the downstream edge of the diffuser 6. The advantage of this configuration is described below with reference to FIGS. 4 and 5.

To pass progressively from a position of maximum axial spacing to a position of maximum axial overlap, and/or to modulate the transverse spacing between the downstream edge of the diffuser 6 and the upstream end of the guide 11, the tubular inlet 12 of the guide may be combined with means (not shown) enabling the relative axial and/or transverse position of the diffuser 6 and the guide 11 to be adjusted and locked, which means may be constituted by any appropriate mechanism, e.g. complementary threads, one provided on the main portion of the guide 11 and the other on its tubular inlet 12, implemented in the form of an endpiece that is thus mounted for axial displacement on the central portion of the guide 11. These adjustment means make it possible to adjust the relative axial and/or radial position of the outlet of the diffuser 6 and the inlet of the guide 11 continuously while the manifold is in service on an engine, e.g. by a drive from at least one electrically controlled actuator, such as an electrical positioning motor controlled as a function of sensors picking up the engine speed and the pressure or the flow rate of the air in the admission manifold, with the measurements delivered by said sensors being input into chart-reading means for the purpose of deducing an electrical signal therefrom for controlling the actuator. By way of example, the actuator may move the tubular inlet 12 of the guide 11 from a first position corresponding to the engine being loaded in a first operating zone of the engine towards a second position which is optimized for a second operating zone of the engine.

With or without such means for adjusting the relative axial and/or radial position of the diffuser 6 and of the guide 11, the diffuser and the guide may also be fixed in position so that the downstream edge of the diffuser 6 is substantially surrounded by the upstream edge of the tubular inlet 12 of the guide 11 without any significant axial overlap or spacing between them. In such an intermediate configuration, the admission manifold still operates as explained below with reference to FIG. 6. An adjustment of the cross-section by radial modulation of the outlet of the diffuser 6 and/or of the inlet of the guide 11 would also be possible, but is generally more expensive.

In this example of an engine having four cylinders in line, the central portion of the guide 11 is subdivided and extends in two symmetrical curved branches 13 inside the plenum chamber 1 so that each of the branches feeds two of the four suction ducts 15 of the manifold with air, each duct 15 being designed to feed air to a respective one of the four cylinders of the engine. The cross-section of each branch 13 tapers progressively from the central portion of the guide 11 downstream from its tubular inlet 12 going towards the ducts 15. In addition, the cross-section of each branch 13 is preferably elliptical and each branch 13 terminates at its downstream end in two same-section outlet openings 14 that are complementary in shape to the section of the corresponding cylinder head duct that extends each suction duct within the cylinder head. Via these outlet openings 14 each branch 13 is connected to the same-shape inlet of a respective one of two corresponding ducts 15 whose cross-section in each case remains complementary to that of the corresponding cylinder head duct and substantially constant along its entire length.

The guide 11 thus serves to share admission air from the diffuser 6 uniformly between all four ducts 15.

Each of these ducts 15 which has the same length and the same cross-section (that is generally elliptical) includes both an upstream portion 16 that is wound in the form of an arc of a circle, thereby constituting a portion of a torus about the axis of the generally-cylindrical plenum 1 and running from the outlet 14 of the corresponding branch 13 of the guide 11, with the upstream portion 16 being contained in the plenum chamber 1, and also a downstream portion 17 which is substantially rectilinear and which connects to the upstream portion 16 via a transition zone 18 that has two bends, as can be seen in the vertical section plane of Figure 2 and in the perpendicular section of FIG. 3. The downstream end of each downstream portion 17 projects from the plenum chamber 1 and is secured to a flange 19 for fixing to the cylinder head of the engine. In a multipoint type injection installation, the flange 19 and the downstream end of each downstream portion 17 of duct 15 are organized to receive a fuel injector 20 for the purpose of injecting fuel into the corresponding duct 15 at the flange 19, i.e. immediately upstream from the cylinder head, and thus upstream from the admission valve(s) of the corresponding cylinder. The injector 20 may be of any known type, being fed with fuel from the side or from the top, for example. In the example described, the injector 20 is fed from the top from a fuel feed strip 21 and it is assisted with air from an additional air feed strip 22.

Given that the ducts 15 are required to have the same length, and because the downstream portions 17 of the ducts 15 are regularly distributed along the flange 19, whereas the upstream portions 16 of the ducts 15 are collected together in pairs in the lateral end portions of the plenum chamber 1 in order to be fed with air from the branches 13 of the guide 11, it will be understood that the angled zones 18 of the endmost ducts 15 have two bends each, while the innermost ducts 15 have only one bend each, as can be seen in FIG. 3.

Because they are secured to the flange 19, the four ducts 15 and the flange 19 may be embodied in the form of an independent part.

The admission duct can thus be embodied merely by assembling together four independent parts: the plenum chamber 1, the diffuser 6, the guide 11, and the assembly comprising the ducts 15 and the flange 19, each part preferably being molded out of a synthetic material or out of a metal or an alloy.

The presence of the diffuser 6 at the outlet from the butterfly valve 2, the presence of its diverging central channel 7, and also the presence of the flow guide 11 and the shape and the varying cross-section of its branches 13 all have the effect of limiting head losses between the valve body 2 and the suction ducts 15.

In FIG. 4, the elements shown diagrammatically have been given the same numerical references as the corresponding elements of the admission manifold of FIGS. 1 to 3.

When the tubular inlet 12' of the guide 11 is in a position of considerable axial overlap with the downstream portion of the diffuser 6, this axial overlap and the permanent adjustable diaphragm effect that results from the transverse spacing between the diffuser 6 and the inlet 12' of the guide 11 have the consequence that the inside volume of the plenum chamber 1 around the diffuser 6 and the guide 11, and also the combined inside volume of the diffuser 6 and of the guide 11 act as two volumes in parallel as represented in FIG. 5, which volumes are connected to each other via the diaphragm 23; one of the volumes (6–11) carrying a flow of air in the direction indicated by the arrow in FIG. 5, such that the inside volume of the plenum 1 constitutes a parallel resonator for a soundwave passing through the diaphragm 23.

In contrast, when the tubular inlet 12 of the guide 11 defines not only the transverse diaphragm 23, but also an axial space relative to the downstream outlet 10 of the diffuser 6, or when said outlet 10 of the diffuser 6 is substantially even with the upstream edge of the inlet 12 of the guide 11, then the inside volume of the plenum chamber 1 behaves like a series resonator (see FIG. 6) relative to soundwaves that develop in the admission manifold. Given the lengths and the sections of the ducts 15 and of the branches 13 of the guide 11, it is possible to adjust the axial position of the inlet to the guide 11 relative to the outlet from the diffuser 6 to modulate the acoustic performance of the admission manifold so that the manifold is frequency tuned to the engine and is relatively silent with respect to internal air flows, while nevertheless providing an increase in torque and/or (by an appropriate choice for the shapes of the diffuser 6 and of the flow guide 11) an increase in power for given fuel consumption, the increase being of the order of 4% compared with conventional embodiments of an admission manifold.

It should also be observed that in the manifold of the invention, adjustment of the relative axial positioning of the diffuser 6 and of the guide 11 has the effect of varying not only the overlap or axial spacing between the diffuser 6 and the guide 11, but also of varying the transverse diaphragm 23 between those two elements.

A compact admission manifold is thus indeed provided, since all of its components (other than the flange 19 for fixing to the cylinder head and the downstream portions 17 of the suction ducts 15) are inside the plenum chamber 1, which manifold has acoustic performance that is capable of being modulated since the relative axial and/or transverse position between the diffuser 6 and the guide 11 can be adjusted, and which manifold presents optimized head losses when the best compromise is being sought between sound nuisance and reduced head losses, because of the presence, the shapes, and the variations in section of the inlet diffuser 6 and of the flow guide 12.

I claim:

1. An admission manifold for an internal combustion engine having fuel injection, the manifold comprising:

a plenum chamber positioned downstream from a butterfly valve that controls the flow of air fed to the engine, said plenum chamber defining a resonance volume; and at least as many suction ducts as there are cylinders in the engine, each suction duct feeding a corresponding cylinder with admission air that it receives from the plenum chamber;

wherein the manifold further comprises:

an air inlet diffuser whose inlet is connected to the outlet of the butterfly valve; and an air flow guide for sharing admission air leaving the diffuser between the suction ducts, and mounted downstream from the inlet diffuser in such a manner that the outlet from the diffuser opens out towards the tubular inlet of the guide which has an upstream edge spaced transversely from the downstream edge of the diffuser relative to the air flow direction so as to define an adjustable permanent diaphragm effect between the inlet diffuser and the flow guide, the inlet diffuser, the flow guide, and at least part of the suction ducts being housed in the plenum chamber.

2. An admission manifold according to claim 1, wherein the inlet diffuser penetrates axially along the air flow axis into the tubular inlet of the flow guide in such a manner as to present axial overlap between the diffuser and the guide.

3. An admission manifold according to claim 1, wherein the diffuser opens out into the plenum chamber upstream from the flow guide in such a manner that an axial space exists between the downstream edge of the diffuser and the upstream edge of the guide.

4. An admission manifold according to claim 1, wherein the downstream edge of the diffuser is substantially surrounded by the upstream edge of the flow guide.

5. An admission manifold according to claim 1, wherein it includes means for adjusting the relative axial and/or transverse position of the inlet diffuser and of the flow guide.

6. An admission manifold according to claim 1, wherein the inlet diffuser has a frustoconical diverging shape that is circular in section.

7. An admission manifold according to claim 1, wherein the flow guide shares the admission air between two groups of suction ducts and includes, downstream from its tubular inlet, two branches, each feeding air to the inlets of a respective one of the groups of suction ducts.

8. An admission manifold according to claim 7, wherein the cross-section of each branch of the flow guide is substantially elliptical and progressively tapering towards the suction ducts.

9. An admission manifold according to claim 1, wherein each suction duct includes an upstream portion wound in a circular arc from the outlet of the corresponding branch of the flow guide and contained in the plenum chamber, and a downstream portion that is substantially rectilinear, the downstream end thereof projecting from the plenum chamber and being secured to a flange for fixing to the cylinder head of the engine and designed to carry an injector for injecting fuel into the corresponding cylinder.

10. An admission manifold according to claim 1, wherein the cross-section of each suction duct is substantially complementary to the shape of the suction of the corresponding cylinder head duct and is substantially constant along its entire length.

* * * * *